Oct. 9, 1945.　　　　C. A. KOTTERMAN　　　　2,386,218
RECTIFIER ELECTRODE CONNECTION ASSEMBLY
Filed Oct. 17, 1942
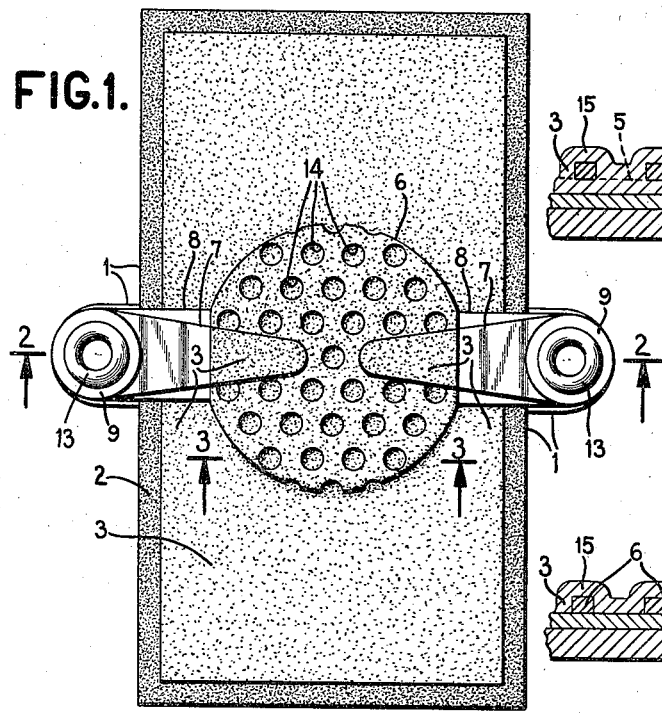
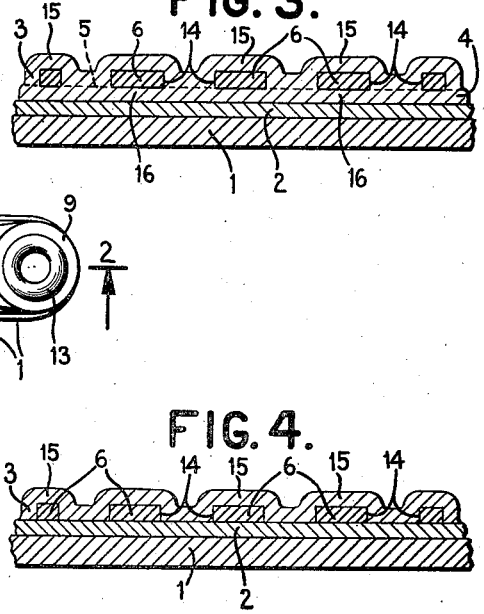
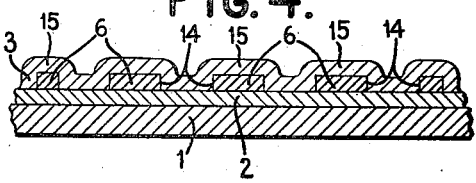
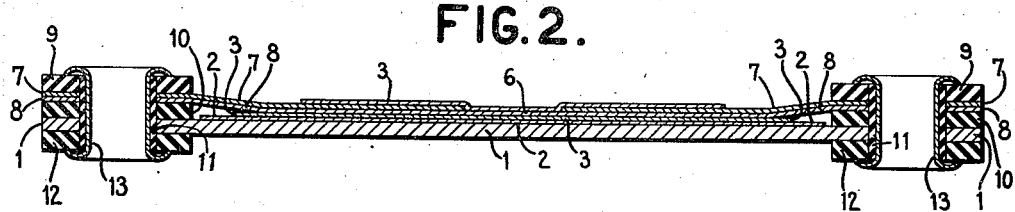
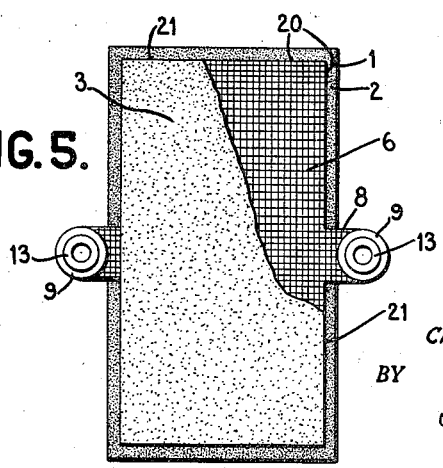
INVENTOR.
CHESTER A. KOTTERMAN
BY
ATTORNEY Patented Oct. 9, 1945

2,386,218

UNITED STATES PATENT OFFICE 3,386,218

RECTIFIER ELECTRODE CONNECTION ASSEMBLY

Chester A. Kotterman, Livingston, N. J., assignor to Federal Telephone & Radio Corporation, a corporation of Delaware Application October 17, 1942, Serial No. 462,380

18 Claims. (Cl. 175—366)

This invention relates to electronic rectifiers of the rectifying junction layer type.

Some of the objects of the present invention are to improve the electrical connections for the rectifying layer of a rectifier of the rectifying junction layer type, to provide a front electrode of improved electrical conductivity, to reduce the resistance losses in the rectifier, to protect the rectifying layer of the rectifier from mechanical injury or injury due to deleterious atmospheric or other disturbing environmental conditions, to simplify and reduce the cost of rectifiers, and generally to improve the construction and operation of rectifiers of the kind referred to.

In accordance with the present invention, a rectifier of the rectifying junction layer type, has its rectifying layer, which may be of selenium or other suitable material, supported on a back plate. The front electrode for the rectifying layer has a connection element associated therewith, the connection element having a portion thereof embedded in the front electrode and a portion thereof extending as a connection from the front electrode. The connection element is preferably a plate, and is preferably foraminous except when the rectifier is of relatively small dimensions. The front electrode is applied to the rectifying layer by coating the layer with metal, as by a spray or other method while pressing the connection element into contact with the coating and then adding to the original coating and extending it to bridge over those parts of the connection element to be embedded in the front electrode, thus producing an integral coherent structure. The construction, as described, provides a combined connection anchorage, front electrode, and sealing coating for protecting the rectifying layer; and is easily manufactured at a low cost. By employing a connection element of metal of high electrical conductivity, such as copper, brass or other suitable metal, embedded in a front electrode of lower electrical conductivity, the conductivity of the front electrode as a whole is improved and resistance losses are reduced.

These and other objects and features of the invention will be apparent from the more detailed description of an example of one embodiment of the invention which follows in connection with the accompanying drawing and the appended claims.

In the drawing:

Fig. 1 is a plan view of a form of rectifier illustrative of the present invention;

Fig. 2 is a section of the rectifier on line 2—2 of Fig. 1, with the different layers of the rectifier exaggerated in thickness for the purpose of clearness;

Figs. 3 and 4 are fragmentary sections of alternative modifications of the rectifier on line 3—3 of Fig. 1; and Fig. 5 is a plan view, on a smaller scale, of a modification of Fig. 1, with the front electrode partly broken away to show a connection element of wire netting.

In Fig. 1, the base plate 1 of steel or other suitable metal, forming the back electrode of the rectifier, is preferably of such thickness as to be substantially rigid. A rectifying junction layer 2 of suitable rectifier forming material, such as metallic selenium, is supported in usual manner on one or both sides of plate 1, a suitable foundation metal layer such as nickel, not shown, being provided in a manner well known in the art, if desired, between rectifying layer 2 and base plate 1.

The front electrode 3 for the rectifying layer 2, is preferably produced by first applying to the front side of layer 2, a preliminary coating 4 of metal, below the dotted line 5 in Fig. 3. The coating 4 may be of Wood's metal for example, or any other suitable metal or alloy. A convenient method of applying electrode 3 to layer 2 is to employ a metal spray of well known character to form a coherent electrically conducting coating extending over the front surface of the rectifying layer, this method making it possible to employ metals of higher melting point than that of the rectifying layer 2 without injury to layer 2, a further advantage being that the electrode 3 may be built up rapidly to any desired thickness without difficulty.

According to the present invention, a metallic connection element 6, preferably in the form of a plate of metal of high electrical conductivity, such as copper, brass, or other suitable metal, and having flexibility adapting it to engage closely in contact with coating 4, is pressed toward coating 4 and layer 2, by the oppositely disposed leaf springs 7, or by other suitable means, not shown, while a further coating, as by the spraying method referred to, is applied to the front side of front electrode coating 4 and connection element 6, to produce an integral coherent coating extending over and bridging those parts of the connection element to be embedded in electrode 3, thus completing electrode 3.

A flexible lead 8, extending integrally from each side of connection element 6 and electrode 3, aids in fixing the position of element 6 during assembly and provides a connection for electrode 3, each lead 8 being positioned under one of the springs 7 which presses toward layer 2 and plate 1. The free end of each lead 8 and one end of each spring 7, are secured fast together and to back electrode 1, between insulating washers 9 and 10, these washers being piloted by the insulating bushing 11 which extends through the holes in washers 9, 10 and 12 and plate 1, the assembly 1, 7, 8, 9, 10, 11, 12, being held securely together by the tubular rivet 13, while the connection element 6 together with front electrode 3 are kept insulated from direct connection with the back electrode 1. It will be understood that one of the leads 8, and one or both of the springs 7, may be omitted if desired.

Connection element 6 is preferably a foraminous plate, having the holes 14, except in cases where the size of the connection element is so small as to be of the order of the dimensions of the portions of the preferred foraminous plate between adjacent holes 14, therein, in which case the perforations may be made smaller or entirely omitted. The holes 14 increase the flexibility of plate 6, thus increasing the number of points of contact obtainable with coating 4, a further advantage being the increased binding effect produced between each pair of bridges 15 and 16, and the rivet-like connections between the front and back sides of plate 6 through holes 14, as shown in Fig. 3.

Fig. 4 shows, alternatively to Fig. 3, a simpler form of rectifier construction in which the first coating 4 of Fig. 3, is omitted and the connection element 6 is coated while directly in contact with rectifying layer 2. As in the case of Fig. 3, the element 6 is embedded in front electrode 3 and the bridges 15, and the rivet-like connections of electrode 3 through holes 14 bind the element 6 securely to the assembly, thus establishing a good electrical connection for front electrode 3.

The rectifier assembly, as described, provides a low cost, easily constructed rectifier. It will be seen that the front electrode 3 combines in one element, the electrode function, an improved anchorage for a connection element having a lead extending therefrom, and a sealing coating for protecting the contact with rectifying layer 2 and for protecting the junction between element 6 and electrode 3. In the Fig. 4 embodiment, the coating 3 also aids in maintaining direct contact between connection element 6 and rectifying layer 2, so that element 6 supplements the electrode function of front electrode 3.

It will be seen in Fig. 1, that the plate 6, covers only a portion of the area of the rectifying layer 2, but it will be understood that the relative size of this portion may be varied within wide limits. The relative size of connection element 6 may be increased, if desired, so that the element 6 extends over substantially the whole effective working area of the rectifying layer 2, as shown in Fig. 5, wherein the front electrode 3 is shown broken away at the upper right corner to expose connection element 3 in the form of a metal wire netting 6, which is of highly conducting metal, such as copper, for example, having the major part of its periphery 20 located close to the periphery 21 of the front electrode 3, or substantially in line therewith.

By providing a connection element 6 of metal of relatively high electrical conductivity, the conductivity of front electrode 3, as a whole, may be appreciably increased, and consequently the resistance losses which are proportional to the product of the current squared multiplied by the resistance, may be appreciably reduced in cases where the coating 2 is of the sprayed-on type and consequently of lower instrinsic conductivity than the same metal in cast, rolled, or plated form, and also in other cases where the metal of electrode 3 is of lower conductivity than that of connection element 6. It will be understood that the wire netting type of connection element, shown in Fig. 5, may also be employed when the element is of smaller size than the front electrode 3, as in Fig. 1.

Other modifications will be apparent to those skilled in the art, in view of the disclosure herein, it being understood that the invention includes such modifications as come within the scope of the appended claims.

What is claimed is:

1. A rectifier of the rectifying junctions layer type, including a metallic front electrode and a metallic connection element having a portion thereof embedded in said electrode and a portion thereof extending from said electrode, said electrode and said connection element both being formed as relatively thin and substantially flat plates.

2. A rectifier according to claim 1, wherein the effective electrical contact conductivity of said connection element is higher than that of said front electrode, whereby the overall resistance of said rectifier is lowered.

3. A rectifier according to claim 1, wherein the major part of the periphery of said connection element is located close to the periphery of said front electrode, whereby the two elements cover nearly identical areas.

4. A rectifier according to claim 1, wherein said connection element is foraminous, and said front electrode extends at least partly through the openings of said connection element so as to provide better mechanical and electrical bonding therewith.

5. A front electrode according to claim 1, wherein said connection element is flexible and foraminous, and said front electrode extends at least partly through the openings of said connection element so as to provide better mechanical and electrical bonding therewith.

6. A rectifier according to claim 1, wherein said connection element includes a wire netting, having the major part of its periphery located close to the periphery of the front electrode, and lying substantially parallel to said front electrode.

7. A rectifier according to claim 1, wherein said rectifying layer includes selenium.

8. A rectifier of the rectifying junction layer type, including a front electrode, and a connection plate embedded in the front electrode, and in metallic contact with said rectifying layer.

9. A rectifier according to claim 8, wherein said connection plate is foraminous.

10. A rectifier assembly having a rectifying layer and front and back electrodes therefor, wherein said rectifying layer has a connection plate cooperating therewith, said front electrode including a metal coating bridging over and sealing said connection plate to said rectifying layer.

11. A rectifier assembly according to claim 10, wherein said connection plate is foraminous.

12. A rectifier assembly according to claim 10, wherein said rectifying layer includes selenium.

13. A rectifier assembly including a rigid metallic base plate having a rectifying junction layer supported on one or both sides, a front electrode in contact with said rectifying layer or layers, a connection element supported by but covering substantially less than the entire area of the front side of said rectifying layer or layers, said front electrode forming a coherent coating having contact with the front of said rectifying layer or layers at the portions thereof not covered by said connection element, said front electrode bridging over those portions of said connection element which cover said rectifying layer or layers and are on the remote side of said connection element from said rectifying layer or layers.

14. A rectifier according to claim 13, in which said front electrode includes bridges under as well as over those portions of said connection element which cover said rectifying layer.

15. A rectifier according to claim 13, in which said connection element has a flexible lead extending integrally from an edge thereof.

16. A rectifier according to claim 13, in which said connection element has a flexible lead extending therefrom, said lead being insulatingly supported at its free end by said base plate.

17. A rectifier according to claim 13, in which said connection element is foraminous and said front electrode is deposited as a coating extending into the openings of said connection element to said assembly.

18. A rectifier according to claim 13, in which a leaf spring member is insulatingly supported from said base plate at one end of the leaf and at the other end of said leaf presses said connection element toward said rectifying layer.

CHESTER A. KOTTERMAN.